United States Patent Office 2,912,437
Patented Nov. 10, 1959

2,912,437

PROCESS FOR THE PRODUCTION OF AROMATIC HOMOCYCLIC OR HETEROCYCLIC DI- AND POLYCARBOXYLIC ACIDS

Hartwig Schütt and Werner Stein, Dusseldorf, Germany, assignors to Henkel & Cie. G.m.b.H., Dusseldorf, Germany, a corporation of Germany No Drawing. Application September 17, 1957
Serial No. 684,420

Claims priority, application Germany
September 19, 1956

20 Claims. (Cl. 260—295.5)

This invention relates to the production of aromatic polycarboxylic acids and their derivatives such as salts and esters. The invention more particularly relates to a process for producing economically desirable aromatic polycarboxylic acids in high yields by selective rearrangement and hydrolysis of aromatic compounds containing as substituents, nitrile, amide or imide radicals. This selective rearrangement is produced by heating the starting materials in the presence of an acid-binding agent and a source of carbon dioxide. For example, terephthalic acid may be produced from benzonitrile or benzamide in such a manner.

It is an object of this invention to produce aromatic homocyclic or heterocyclic polycarboxylic acids in high yields by selective rearrangement and hydrolysis of aromatic nitriles, amides and imides.

Another object of this invention is to produce terephthalic acid in high yields from such starting materials as, for example, benzonitrile, benzamide, orthophthalimide, the dinitrile and the diamide of orthophthalic and metaphthalic acids.

A further object of this invention is to produce heterocyclic dicarboxylic acids in high yields.

These and other objects of this invention will become apparent as the description proceeds.

We have found that aromatic homocyclic or heterocyclic di- and polycarboxylic acids or their salts or derivatives may be obtained by heating nitriles or the corresponding acid amides, the nitrile or acid amide groups of which are attached to an aromatic homocyclic ring system or to an aromatic heterocyclic ring system, in the presence of carbon dioxide, which may also be present in combined form, and in the presence of acid-binding agents to temperatures above 250° C. The salts of aromatic homocyclic or heterocyclic di- or polycarboxylic acids thus obtained may be transformed into the corresponding free acids or their derivatives in accordance with known methods.

The starting materials for the process according to the present invention may be aromatic homocyclic mono-, di-, or polynitriles or the corresponding acid amides, such as benzonitrile, α- and β-naphthonitrile, as well as the nitriles derived from phthalic acid, isophthalic acid, terephthalic acid, naphthalic acid and other naphthalene-dicarboxylic acids, or the corresponding acid amides. Similarly, nitriles or acid amides in which the —CN or —CONH$_2$ groups are attached to another aromatic homocyclic ring system, such as to anthracene, diphenyl, terephenyl, diphenylmethane or benzophenone, are suitable for use as starting materials for the process according to the invention. Moreover, mixtures of such compounds may be used. In most cases mixtures of various isomers yield uniform reaction products.

Still further, those nitriles or acid amides may be used as starting materials in the process according to the invention, the —CN or —CONH$_2$ groups of which are attached to an aromatic heterocyclic ring system. Such compounds are derived, for example, from pyridine, pyrazine, pyrimidine, pyridazine, α-pyran, furan, thiophene, thiazole, pyrrole, pyrazole, imidazole, quinoline, isoquinoline, indole, benzotriazole or benzimidazole.

In all of these nitriles and acid amides the aromatic homocyclic ring or the heterocyclic ring having an aromatic structure may, in addition to the —CN or —CONH$_2$ groups, also carry other substituents, such as halogen atoms, alkyl radicals, carboxyl groups, sulfonic acid groups or phosphonic acid groups, provided the presence of such substituents does not cause a decomposition of the molecule at temperatures below the reaction temperature.

Preferred starting materials for the performance of the process on an industrial scale are aromatic homocyclic and heterocyclic mononitriles, such as benzonitrile, α- and β-naphthonitrile, the mononitriles of pyridine and thiophene and the like, as well as the corresponding acid amides. From such mononitriles the process according to the present invention yields dicarboxylic acids and in many cases those dicarboxylic acids which have a symmetric structure, such as terephthalic acid, naphthalene-2,6-dicarboxylic acid, pyridine-2,5-dicarboxylic acid, thiophene-2,5-dicarboxylic acid and the like. Tricarboxylic acids are in some cases formed as side products.

If aromatic homocyclic or heterocyclic nitriles or acid amides having more than one —CN or —CONH$_2$ group in the molecule are used as starting materials in the process according to the present invention, the principal products in many cases are also dicarboxylic acids, the carboxyl groups of which are often not in the same positions on the ring as the —CN or —CONH$_2$ groups in the starting materials. If mononitriles are used as starting materials, the original nitrile group may also migrate within the molecule, so that if a heterocyclic mononitrile, for example, is used the end products obtained thereby do not correspond to the starting materials with respect to structure.

According to the process of the present invention the above-mentioned starting materials are heated to temperatures above 250° C. in the presence of carbon dioxide, which may also be present in combined form, and in the presence of acid-binding agents. Acid-binding agents are those chemical compounds capable of combining to neutralize the acids produced by the reaction. Acid-binding agents which may be used include primarily the carbonates, bicarbonates, formates or oxalates of the alkali metals. These compounds may be added as such or formed in situ in the reaction medium. Especially good results are obtained with potassium carbonate.

Since the oxalates and formates are transformed into carbonates upon heating, they also contain carbon dioxide in combined form within the scope of the foregoing disclosure. Consequently, they may be used simultaneously as acid-binding agents and as sources of carbon dioxide, similar to the carbonates and bicarbonates. It is preferred, however, to provide additional gaseous carbon dioxide together with the acid-binding agents. It is, however, also possible to carry out the reaction in the presence of other inert gases, such as nitrogen, methane or argon, if a sufficient amount of carbon dioxide in combined form, for example in the form of potassium carbonate, is added to the reaction mixture. Similarly, gaseous mixtures which contain inert gases in addition to CO$_2$ may be used. The presence of large quantities of oxygen is preferably avoided. In all cases it is advantageous to carry out the reaction at elevated pressures, for example at initial pressures between 5 and 500 atmospheres.

In addition to the above-mentioned alkali metal compounds, the acid-binding agents which may be used also include the corresponding compounds of other metals, for example of the alkali earth metals; the use of alkali earth metals, however, often produces other reaction products, especially other isomers.

It is advantageous to employ the acid-binding agents in a dry and as finely divided state as possible. They do not need to be in stoichiometric amounts. However, in order to achieve as complete a reaction of the nitriles as possible, it is advantageous, for example in the reaction of mononitriles, to provide more than 1.5 mols potassium carbonate per mol equivalent of nitrile or amide.

It has further been found that the reaction according to the present invention is favorably influenced by the presence of catalysts. Such catalysts include primarily heavy metals, such as zinc, cadmium, mercury, iron and lead, as well as their compounds, primarily in the form of their halides.

The reaction begins, as a rule, at temperatures above 250° C. The optimum reaction temperature is different depending upon the starting materials. For example, in the production of terephthalic acid from benzonitrile, the optimum reaction temperature lies at about 370°–400° C. The upper temperature limit for the process is generally determined merely by the decomposition temperature of the organic substance, which in many cases lies above 500° C.

Since the reaction mixtures tend to cake, it is often advantageous to carry out the process in the presence of an inert diluent, which may be liquid or solid, and which is adapted to prevent caking and to improve the gas permeability of the reaction mixture. Such additives are, for example, sand, powdered pumice stone, metal powders, metal shavings, kieselguhr, activated charcoal, finely divided aluminum oxide, finely divided silicic acid, or other inert salts, such as sodium sulfate. In place of these solid inert substances, inert liquids which do not decompose under the prevailing conditions may also be used, such as diphenyl or diphenyl ether.

In order to avoid local overheating and decomposition caused thereby, and to avoid caking of the reaction mixture, it is advantageous in carrying out the reaction according to the present invention to maintain the reaction mixture in motion. This may be accomplished, for example, by working in vessels provided with a stirring device or a helical screw, in rotating drums, in rocking autoclaves or rotary autoclaves. Uniform heating of the reaction mixture may also be effected by distributing the reaction mixture in the reaction vessel in thin layers, with or without agitation. However, good yields are obtained even without these auxiliary measures provided care is taken to avoid strong local overheating.

The reaction mixture may be worked up in accordance with known methods, for example as follows: The raw product is first dissolved in water or dilute acids and any unreacted portions of the starting material are separated therefrom, if necessary. Subsequently, the aqueous solution is purified by filtration or treatment with activated charcoal or other decolorizing agents. Thereafter the salts formed by the reaction can be transformed into the corresponding free acids by acidification with organic or inorganic acids, or by introducing $CO_2$ at atmospheric or elevated pressures. The free acids can be separated from each other by methods based on their varying solubilities or volatilities, and may thus be isolated in pure form or, if desired, be transformed into their derivatives. The salt mixtures obtained by the reaction may also be directly transformed into derivatives of the acids, for example into their halides or esters. The derivatives, such as the esters, may be further purified, if desired, by fractional distillation.

The following examples will enable persons skilled in the art to better understand and practice the invention and are not intended to limit the invention.

*Example 1*

A mixture of 50.0 gm. anhydrous potassium carbonate, 2.0 gm. cadmium fluoride, and 10.0 gm. freshly distilled benzonitrile was placed into a rotary autoclave having a net volume of 200 cc. Thereafter the autoclave was flushed with carbon dioxide and evacuated. 70 gm. liquid $CO_2$ were then introduced into the autoclave. Finally, the contents were heated for 10 hours at 400° C. Upon heating, a pressure of 300 atmospheres developed. After cooling and releasing the pressure, the raw reaction product was dissolved in 400 cc. water. By extraction of the solution with ether, 1.6 gm. benzonitrile were recovered. Subsequently, the aqueous solution was filtered, and the filtrate was heated to the boiling point and acidified with concentrated hydrochloric acid. The terephthalic acid precipitated thereby was filtered off while the solution was still hot and the filter cake was washed with hot water. The yield of terephthalic acid was 5.1 gm. By extraction of the mother liquor with ether, 0.6 gm. benzoic acid was recovered.

*Example 2*

A mixture of 50.0 gm. anhydrous potassium carbonate, 2.0 gm. cadmium fluoride, and 10.0 gm. freshly distilled benzonitrile was placed into a rotary autoclave having a net volume of 200 cc., and gaseous carbon dioxide was introduced into the autoclave until the internal pressure reached 50 atmospheres. The contents were then heated to 380° C. which produced an internal pressure of 183 atmospheres. The contents were maintained at 380° C. for 8 hours. The reaction product was dissolved in 400 cc. water and the resulting solution was filtered. Thereafter, the filtrate was heated and acidified with concentrated hydrochloric acid. The terephthalic acid precipitated thereby was filtered off while the solution was still hot, and the filter cake was washed with hot water. The yield of terephthalic acid was 11.2 gm. (69% of theory).

The same procedure was repeated but without the addition of cadmium fluoride; 8.4 gm. terephthalic acid were obtained, which corresponds to a yield of 52% of theory.

*Example 3*

A mixture of 50.0 gm. anhydrous potassium carbonate, 2.0 gm. cadmium fluoride, and 10.0 gm. freshly distilled benzonitrile was placed into a stationary autoclave. Thereafter about 175 gm. liquid carbon dioxide were introduced and then the contents were heated for 10 hours at 400° C. which produced an internal pressure of about 1500 atmospheres. The reaction mixture was worked up in the manner described in Example 1. 6.9 gm. terephthalic acid were obtained.

*Example 4*

A mixture of 10.0 gm. benzamide, 50.0 gm. anhydrous potassium carbonate, and 3.0 gm. cadmium fluoride was finely milled in a ball mill and was then placed into a stationary autoclave having a net volume of 250 cc. Thereafter 175 gm. liquid $CO_2$ were introduced into the autoclave. The reaction mixture was heated for 10 hours at 400° C. which produced an internal pressure of about 1200 atmospheres. The reaction product was worked up in the manner above-described. 3.4 gm. terephthalic acid were obtained.

The same procedure was repeated except that gaseous $CO_2$ was introduced into a rotary autoclave prior to heating the autoclave and pressurized to 50 atmospheres; upon heating the contents of the autoclave, the internal pressure reached 180 atmospheres. 4.5 gm. terephthalic acid were obtained.

*Example 5*

10.0 gm. β-naphthonitrile, 50.0 gm. anhydrous potassium carbonate and 3.0 gm. cadmium fluoride were placed into a rotary autoclave having a net volume of 250 cc.

Thereafter gaseous $CO_2$ was introduced until the internal pressure reached 50 atmospheres, and the contents of the autoclave were heated for 6½ hours at 400° C. The reaction product was dissolved in 500 cc. water, the solution was filtered and the filtrate was heated and acidified with hydrochloric acid. 5.5 gm. naphthalene-2,6-dicarboxylic acid were obtained.

The same procedure was repeated but α-naphthonitrile was used as the starting material. 1.8 gm. naphthalene-2,6-dicarboxylic acid were obtained.

Example 6

10.0 gm. of a mixture of α- and β-naphthonitrile, which was produced from a raw mixture obtained by sulfonating naphthalene, together with 50 gm. potassium carbonate was placed into a rotary autoclave having a net volume of 200 cc. Thereafter gaseous $CO_2$ was introduced into the autoclave until the internal pressure reached 50 atmospheres and the contents were heated for 5 hours at 390° C. Upon working up the reaction mixture in the manner described above, 4.7 gm. naphthalene-2,6-dicarboxylic acid were obtained.

Example 7

A mixture of 250.0 gm. potassium carbonate, 15.0 gm. cadmium fluoride and 50.0 gm. benzonitrile was placed into a rotary autoclave having a net volume of 1.5 liters. Subsequently gaseous carbon dioxide was introduced until the internal pressure reached 50 atmospheres, and the contents were heated for 14 hours at 375° C., which produced an internal pressure of about 160 atmospheres. The light-colored, loose raw reaction product weighed 311 gm. It was added to 1 liter of water and the resulting solution was extracted by shaking with ether. 8.5 gm. benzonitrile were recovered from the ether phase. The aqueous phase was worked up in the manner described in the preceding examples. 46.1 gm. terephthalic acid were obtained. Taking into consideration the amount of benzonitrile recovered from the ether phase, the yield of terephthalic acid was 68.8% of theory.

Example 8

A mixture of 6.4 gm. orthophthalic acid dinitrile, 30.0 gm. anhydrous potassium carbonate, and 3.0 gm. anhydrous zinc chloride was placed into a rotary autoclave having a net volume of 200 cc. Thereafter gaseous $CO_2$ was introduced until the internal pressure reached 50 atmospheres, and the contents were heated for 5 hours at 380° C. After cooling and releasing the internal pressure, the raw reaction product was dissolved in 250 cc. water. The resulting solution was filtered and the filtrate was heated and acidified with hydrochloric acid. The terephthalic acid precipitated thereby was filtered off while the solution was still hot, and the filter cake was washed with hot water. 7.5 gm. terephthalic acid were recovered.

Example 9

A mixture of 8.2 gm. orthophthalic acid diamide, 30.0 gm. anhydrous potassium carbonate, and 3.0 gm. cadmium fluoride was placed into a rotary autoclave having a net volume of 200 cc. Thereafter gaseous $CO_2$ was introduced into the autoclave until the internal pressure reached 50 atmospheres, and the contents were heated for 5 hours at 380° C. The reaction product was dissolved in 300 cc. water and the resulting solution was filtered. The clear filtrate was concentrated to a volume of 70 cc. by evaporation and then cooled with ice. 6.5 gm. dipotassium terephthalate crystallized out. By dissolving the dipotassium salt in water and acidifying the resulting solution with hydrochloric acid, 4.4 gm. terephthalic acid were obtained.

Example 10

A mixture of 20.0 gm. potassium phthalimide, 29.8 gm. anhydrous potassium carbonate, and 4.0 gm. of the double salt $K_2CdF_2Cl_2$ was evenly divided into four parts, each part was placed into a test tube and packed tightly in the bottom of the tube. Thereafter each test tube was heated for 7 hours at 380° C. in an aluminum block while passing gaseous carbon dioxide over the reaction mixture. After cooling the reaction products in the test tubes were combined and dissolved in water. The resulting solution was worked up in the manner described above. 9.6 gm. terephthalic acid were obtained.

Example 11

A mixture of 10.0 gm. β-cyano-pyridine, 30.0 gm. anhydrous potassium carbonate, and 3.0 gm. cadmium fluoride was placed into a rotary autoclave having a net volume of 200 cc. Thereafter gaseous $CO_2$ was introduced until the internal pressure reached 50 atmospheres and the contents were heated to 320° C. for 6 hours. The brown raw reaction product was suspended in 150 cc. water, the suspension was filtered and the filtrate was acidified with concentrated hydrochloric acid until its pH was about 2. After allowing the acid solution to stand for some time, 8.7 gm. isocinchomeronic acid precipitated out which was contaminated with small amounts of the acid potassium salt. By reprecipitation and clarification of the solution with activated charcoal, the raw isocinchomeronic acid was transformed into the pure product.

Example 12

A mixture of 10.0 gm. α-furano-nitrile, 20.0 gm. anhydrous potassium carbonate, and 3.0 gm. cadmium fluoride was placed into a rotary autoclave having a net volume of 200 cc. Thereafter gaseous $CO_2$ was introduced into the autoclave until the internal pressure reached 50 atmospheres and the contents were heated to 290° C. for 1 hour. The gray raw reaction product was suspended in 150 cc. water, the resulting suspension was filtered, the filtrate was clarified with activated charcoal and acidified with hydrochloric acid. 4.7 gm. of the acid potassium salt of dehydromucic acid, which was contaminated by a small amount of free acid (acid number=325), crystallized out.

While we have described particular embodiments of our invention, it will be understood that the invention is not limited thereto and that various modifications and adaptations thereof may be made without departing from the scope of the invention as set forth in the disclosure and the following claims.

We claim:

1. A process for the production of compounds selected from the group consisting of aromatic polycarboxylic acids and salts and esters thereof by selective rearrangement which comprises reacting an aromatic compound containing nitrogen-containing substituents attached directly to the ring selected from the group consisting of nitrile, amide and imide groups with an acid-binding agent and a source of carbon dioxide selected from the group consisting of free carbon dioxide and bound carbon dioxide at temperatures above about 250° C., under substantially anhydrous conditions, and recovering compounds selected from the group consisting of aromatic polycarboxylic acids and salts and esters thereof.

2. The process of claim 1 wherein said acid-binding agent utilized is at least a stoichiometric excess of potassium carbonate.

3. The process of claim 1 wherein the reaction is carried out at initial pressures of from about 5 to about 500 atmospheres.

4. The process of claim 1 wherein the reaction is carried out in the presence of inert diluents.

5. The process of claim 1 wherein the reaction is carried out in the presence of a catalyst selected from the group consisting of heavy metals and their compounds.

6. The process of claim 1 wherein polycarboxylic acids are recovered by dissolving the reaction product in water and acidifying to separate said polycarboxylic acids.

7. A process for the production of terephthalic acid by selective rearrangement which comprises reacting a benzene compound containing nitrogen-containing substituents attached directly to the ring selected from the group consisting of nitrile, amide and imide groups with an acid-binding agent and a source of carbon dioxide at a temperature above about 250° C., under substantially anhydrous conditions, and recovering the terephthalic acid produced.

8. The process of claim 7 wherein said benzene compound is benzonitrile.

9. A process for the production of terephthalic acid by selective rearrangement which comprises reacting benzonitrile with a stoichiometric excess of potassium carbonate in a carbon dioxide atmosphere under initial pressures of from 5 to 500 atmospheres in the presence of a catalytic amount of a cadmium-containing catalyst by heating to a temperature of from about 370° C. to about 400° C., under substantially anhydrous conditions, dissolving the reaction product in water and acidifying to separate the terephthalic acid produced.

10. The process of claim 7 wherein the said benzene compound is benzamide.

11. A process for the production of terephthalic acid by selective rearrangement which comprises reacting benzamide with a stoichiometric excess of potassium carbonate in a carbon dioxide atmosphere under initial pressures of from 5 to 500 atmospheres in the presence of a catalytic amount of a cadmium-containing catalyst by heating to a temperature of from about 370° C. to about 400° C., under substantially anhydrous conditions, dissolving the reaction product in water and acidifying to separate the terephthalic acid produced.

12. The process of claim 7 wherein the said benzene compound is the dinitrile of orthophthalic acid.

13. The process of claim 7 wherein the said benzene compound is the diamide of orthophthalic acid.

14. The process of claim 7 wherein the said benzene compound is the potassium salt of orthophthalimide.

15. A process for the production of naphthalene-2,6-dicarboxylic acid by selective rearrangement which comprises reacting a naphthalene compound containing nitrogen-containing substituents attached directly to the ring selected from the group consisting of nitrile, amide and imide groups with an acid-binding agent and a source of carbon dioxide at a temperature above about 250° C., under substantially anhydrous conditions, and recovering the naphthalene-2,6-dicarboxylic acid produced.

16. The process of claim 15 wherein the said naphthalene compound is $\alpha$-naphthonitrile.

17. The process of claim 15 wherein the said naphthalene compound is $\beta$-naphthonitrile.

18. The process of claim 15 wherein the said naphthalene compound is a mixture of $\alpha$-naphthonitrile and $\beta$-naphthonitrile.

19. A process for the production of isocinchomeronic acid by selective rearrangement which comprises reacting $\beta$-cyano-pyridine with an acid-binding agent and a source of carbon dioxide at a temperature above about 250° C., under substantially anhydrous conditions, and recovering the isocinchomeronic acid produced.

20. A process for the production of dehydromucic acid by selective rearrangement which comprises reacting $\alpha$-furano-nitrile with an acid-binding agent and a source of carbon dioxide at a temperature above about 250° C., under substantially anhydrous conditions, and recovering the dehydromucic acid produced.

References Cited in the file of this patent

UNITED STATES PATENTS

| | | |
|---|---|---|
| 2,794,830 | Raecke et al. | June 4, 1957 |
| 2,823,228 | Raecke et al. | Feb. 11, 1958 |
| 2,823,229 | Raecke et al. | Feb. 11, 1958 |
| 2,823,230 | Raecke et al. | Feb. 11, 1958 |
| 2,823,231 | Raecke et al. | Feb. 11, 1958 |